Nov. 1, 1966  E. J. SCHAEFER  3,283,187
ELECTRIC MOTOR WITH A LAMINATED BORE LINER
Filed March 12, 1964
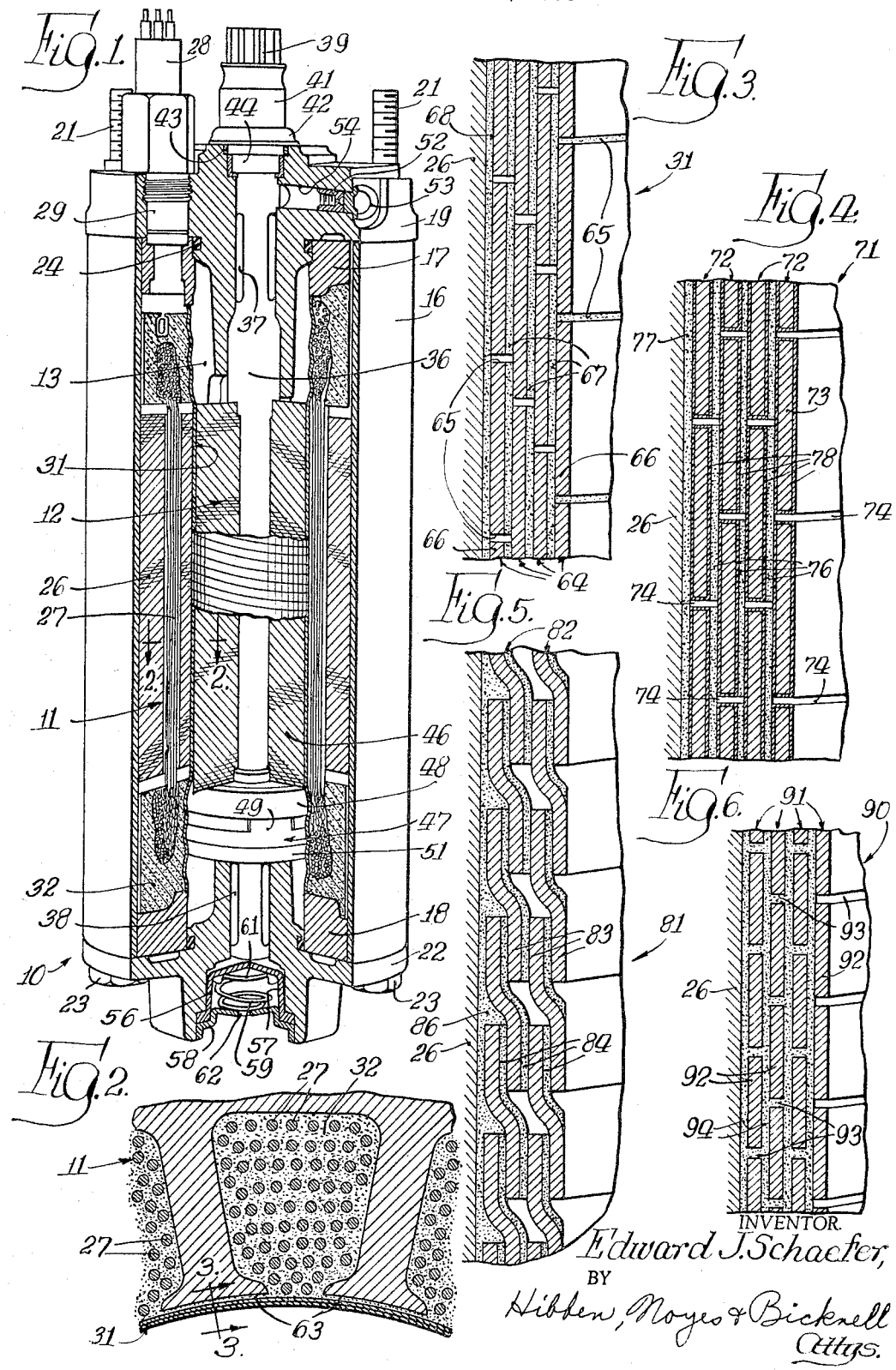
INVENTOR.
Edward J. Schaefer,
BY
Hibben, Noyes & Bicknell
Attys.

United States Patent Office 3,283,187
Patented Nov. 1, 1966

3,283,187
ELECTRIC MOTOR WITH A LAMINATED BORE LINER
Edward J. Schaefer, Bluffton, Ind., assignor to Franklin Electric Co., Inc., Bluffton, Ind., a corporation of Indiana
Filed Mar. 12, 1964, Ser. No. 351,344
21 Claims. (Cl. 310—86)

This invention relates generally to electric motors, and more particularly to an electric motor having a sealed stator construction.

Electric motors have been provided, having a sealed stator construction. A motor of this type is suitable for use, for example, as a drive motor for a pump in a well. Liquid similar to that wtihin the well is permitted to circulate within the motor, thus obviating the need for highly effective seals around the shaft of the motor, and the liquid also serves as a lubricant for the bearings of the motor.

The rotor of such a motor may be easily protected against damage due to the liquid because it may be a squirrel cage type having a protective plating or coating. To prevent the liquid within the motor from reaching the windings of the stator, a liquid proof seal has been provided which covers the inner periphery of the stator.

An excellent liquid proof seal for a motor of this type is disclosed in the applicant's Patent No. 2,654,848 dated October 6, 1953, and Patent No. 2,761,985 dated September 4, 1956. The seal disclosed in these patents comprises a thin walled metal liner which is secured to the interior surface of the stator and forms with the external metal casing or shell of the stator a liquid proof enclosure for the core structure and the wings of the stator. Some electrical losses occur in a linear of this construction, however. These electrical losses are primarily due to electric currents which are induced in the metal liner by the magnetic flux that traverses the liner radially in passing from the stator to the rotor, the flow of such currents being primarily in the axial direction. In the past, the amount of these losses has been held to a relatively low level by making the liner of a very high resistance material, and by making the wall thickness of the liner small.

Relatively high frequency applications of such motors has posed problems, however. The electrical losses in the liner increase at least in direct proportion to the frequency, and at 400 c.p.s., for example, the losses in a liner of the type described are considerable. Attempts to reduce these losses by increasing the resistance of the liner material or by further decreasing the wall thickness of the liner have not been successful because the practical limits in these directions have already been reached.

A similar problem has arisen where a motor having a sealed stator construction is subjected to relatively high pressure, for example, in atomic energy applications. If, even at relatively low frequencies, the wall thickness of a liner of this construction were increased sufficiently to withstand the high pressures, the electrical losses in the liner would be excessive.

Accordingly, it is an object of this invention to provide an electric motor of the type described, including a liner which has very low electrical losses even at relatively high frequencies.

It is another object to provide an electirc motor of the type described, including a liner which has very low electrical losses even when its wall thickness is sufficiently great to withstand high pressures.

Other objects and advantages of the invention will become apparent from the following description taken in conjunction with the accompanying figures of the drawing, in which:

FIG. 1 is a longitudinal sectional view of a motor embodying the features of the invention;
FIG. 2 is an enlarged sectional view taken on the line 2—2 of FIG. 1;
FIG. 3 is a further enlarged sectional view taken on the line 3—3 of FIG. 2;
FIG. 4 is a view similar to FIG. 3 but showing an alternative construction of a portion of the motor;
FIG. 5 is a view similar to FIGS. 3 and 4 and showing still another alternative construction; and
FIG. 6 is a view similar to FIGS. 3 to 5 and showing still another alternative construction.

In general, an electric motor emboding the invention comprises a stator having a central bore formed therethrough and a rotor rotatably mounted within the bore. The stator comprises a laminated core structure which is supported by an external housing, said bore being formed through the core structure. A plurality of stator windings are carried by the core structure, and a liquid-proof liner is positioned within the bore and covers the inner periphery of the core structure.

The liner includes at least one metal tube having a plurality of electrical discontinuities in the axial direction, these discontinuities reducing the magnitude of currents flowing in the axial direction. To this end, the tube may be formed by a strip of metal which is wound in helical fashion. A plurality of such tubes is preferably provided, the tubes being coaxial and secured together. Further, the electrical discontinuities in one tube are preferably adjacent electrically continuous portions of adjacent tubes.

With reference to FIG. 1 of the drawing, a motor of the type designed to be submerged in a liquid is shown, comprising a housing 10 which supports and encloses a stator 11 and a rotor 12. The stator 11 is secured to the housing 10 and has a bore 13 formed therein, and the rotor 12 is rotatably mounted on the housing 10 within the bore 13.

The housing 10 comprises a cylindrical metal sleeve 16 having secured therein as by welding, upper and lower end rings 17 and 18 at its upper and lower ends, respectively. The housing 10 further comprises an upper end bell 19 which may be secured to the upper end ring 17 by a plurality of studs 21 and a lower end bell 22 which may be secured to the lower end ring 18 by a plurality of cap screws 23. The studs 21 may extend upwardly from the upper end bell 19 for the purpose of connecting the motor to a unit to be driven, such as a pump. O-ring seals 24 are preferably provided between the rings 17 and 18 and the end bells 19 and 22 to make the connections between these members liquidtight.

The stator 11 comprises a core structure 26 made up of laminations which may be secured together in any conventional manner. Longitudinal passages are formed through the core structure, and these passages receive armature windings 27. Electrical connections between the windings 27 and an external power circuit are made by a three wire cable 28 and a water tight connector 29, the connector 29 extending through openings formed in the upper end ring 17 and the upper end bell 19 and being threaded to the upper end bell 19. A cylindrical water tight liner 31, to be described in more detail later, covers the inner periphery of the core structure and preferably extends from the upper end ring 17 to the lower end ring 18. The armature windings 27 extend beyond the ends of the core structure 26, and the space around the end of the armature windings 27 and also the space within the passages of the core structure 26 is preferably filled with an insulating compound 32, (FIGS. 1 and 2).

The rotor 12 comprises a rotor shaft 36 rotatably mounted by means of upper and lower sleeve bearings 37 and 38 on the upper and lower end bells 19 and 22. The upper end of the shaft 36 may be splined as at 39 for connection with a unit to be driven and a sleeve-like protector 41 may be provided for the splines. Also at the upper end of the shaft 36 are preferably provided a sand slinger 42, a sand shield 43, and a seal 44, the members 42 to 44 preferably being provided to prevent sand or other particles from entering the interior of the motor around the shaft 36.

Secured to the shaft 36 within the stator bore 13 is a stack 46 of rotor laminations, which stack 46 supports rotor windings preferably of the squirrel cage type. Between the stack 46 and the lower end bell 22 is preferably provided a thrust bearing assembly 47 which supports the weight of the rotor 12 and also any downward thrust due to a unit being driven by the motor. The assembly 47 may comprise a graphite disk 48 connected to the shaft 36, a bearing segment support disk 49, and a leveling disk 51 which is supported by the lower end bell 22 and in turn supports the disk 49.

The type of motor illustrated is usually prefilled with a type of liquid similar to the liquid that the motor is to be submersed in, and this liquid acts as a lubricant for the sleeve bearings 37 and 38 and for the thrust bearing 47. If some of the liquid within the motor is lost in any manner during operation of the motor, it may be replaced by some of the liquid from outside the motor, which may flow into the interior of the motor through a check valve 52 and a filter 53. The valve 52 and the filter 53 are positioned in a fluid passageway 54 formed in the upper end bell 19. At the lower end of the motor, a flexible pressure-equalizing diaphragm 56 is provided, which compensates for any pressure changes of the liquid either within or without the motor. The diaphragm 56 is positioned within a central opening 57 formed in the lower end bell 22, and is held in sealing engagement with the end bell 22 by a sealing cap 58. A compression spring 59 and a cup 61 are positioned between the cap 58 and the inner end of the diaphragm 56 and holds the diaphragm in extended position. A hole 62 may be formed through the cap 58 to permit liquid to reach the outer surface of the diaphragm 56. It will be apparent that the diaphragm 56 may expand or contract with changes in liquid pressure, and thereby prevent rupture of the seals of the motor.

As shown in FIG. 2, the laminations of the stator core structure 26 may be stamped to form the passages for the stator windings 27. The passages may or may not open into the stator bore 13. In the present instance, the passages open into the stator bore 13 and form pole faces 63 therebetween. The liner 31 seals the inner periphery of the stator 11 and prevents liquid from reaching the stator laminations and the windings 27, and is supported throughout its central portion by the stator core and at its end portions by the compound 32. The liner 31 comprises a plurality of concentric metal tubes 64 (FIG. 3) each having a plurality of electrical discontinuities 65 in the axial direction. Each tube 64 may comprise an elongated ribbon or strip 66 of metal which is wound in helical fashion, the edges of each convolution of the tubes 64 being spaced from the edges of adjacent convolutions. The spaces between the edges of the convolutions thus form the previously mentioned axial discontinuities 65. The tubes 64 are secured together by an adhesive 67 which also electrically insulates adjacent tubes 64 from each other, and the liner 31 is held against the inner periphery of the stator core structure by, for example, internal pressure or an adhesive. In the present instance, an adhesive 68 which is also preferably an electrical insulator is shown, securing the liner 31 to the pole faces 63 of the core structure. As shown in FIG. 3, the discontinuities 65 of the respective tubes 64 are radially adjacent electrically conductive portions of adjacent tubes so that the liner 31 will be leakproof. Moreover, the discontinuities 65 in each tube 64 are preferably longitudinally offset from the discontinuities 65 of all of the other tubes, or, in other words, the discontinuities of two or more tubes are preferably not in radial alignment, so that the liner will be leakproof and strong.

The total thickness required of the liner 31 depends upon the magnitude of pressure the liner is required to withstand. For relatively low pressure applications, the total wall thickness of the liner 31 may be the same as that of the liner described in the previously mentioned patents, which is in the range of .005 inch. The strips 66 are preferably made of a high resistance metal, although a low resistance metal such as aluminum may be desired in some applications because its surface may be oxidized. This would be advantageous because aluminum oxide is an excellent insulator. The adhesives 67 and 68 may be a rubber base or epoxy base organic adhesive, but it will be understood that other means may be provided for securing the tubes 64 together in insulating relation.

The liner 31 may be formed by helically winding the strips 66 on an arbor and providing as many layers or tubes 64 as is necessary to give the desired strength. To offset the discontinuities 65 in the manner shown in FIG. 3 when winding the strips on an arbor, the strips may all be wound in the same direction and the starting points of the strips of the four tubes may be offset one-fourth a revolution. If five tubes were provided, the starting points may be offset one-fifth revolution, etc. Staggering of the discontinuities may also be accomplished, for example, by winding the strips of adjacent tubes in opposite directions. Other methods of winding the strips on an arbor to form a liner are of course also available.

The outer diameter of the liner 31 is preferably initially made less than the diameter of the bore 13, and the liner is later expanded into engagment with the pole faces 63 of the core structure and secured thereto. One side of each strip may be initially covered with the adhesive 67, and the tubes may be formed such that the side of one tube having the adhesive engages the side of the next adjacent tube which does not have an adhesive coating, so that a layer of adhesive separates and insulates adjacent tubes.

The strips 66 may be provided with the adhesive 67 on either the inner or the outer side. When the adhesive 67 is on the inner side, as is described herein, the adhesive 67 on the innermost tube 64 should be removed or strip material not having an adhesive thereon may be used for the innermost of the tubes 64. When pressure is applied to the liner to expand it into engagement with the inner periphery of the stator, some of the adhesive 67 may be squeezed into the spaces of discontinuities 65 between the edges of the convolutions of the tubes. Some of the adhesive 68, when an adhesive is used to secure the liner to the stator, may also be squeezed into the discontinuities 65 of the outermost of the tubes 64. When the adhesive 67 is applied to the outer sides of the strips, the inner side of the innermost tube is of course clear of adhesive as shown in the drawing. The adhesive on the outermost of the tubes may become the adhesive 68.

During the operation of the motor, magnetic flux flows through the liner 31 and induces currents in the liner which flow primarily in the axial direction. Due to the large number of axial discontinuities 65, as compared with what the magnitude would be if the liner 31 were axially continuous, the magnitude of these currents is greatly diminished. This is somewhat analogous to the operation of a laminated magnetic core structure which results in far less electrical losses than a solid core structure. The losses in the liner 31 may be further diminished by making the strips 66 very thin and providing a plurality of tubes as shown in FIG. 3. By offsetting or staggering the discontinuities 65, the liner 31 may easily be made leakproof and strong.

FIG. 4 shows the construction of another liner 71, comprising a plurality of concentric tubes 72 which are secured together. Each tube 72 comprises a helically wound metal strip 73, the edges of adjacent convolutions being spaced from each other to provide axial discontinuities 74 as explained with regard to FIG. 3. The discontinuities of every other of the tubes 72 are shown as being in radial alignment, but it should be understood that the strips may be wound in the manner described for FIG. 3 wherein all of the discontinuities are staggered. The tubes 72 are secured together by a suitable adhesive 76, and another adhesive layer 77 may be provided to secure the liner 71 to the stator core structure.

In addition to the adhesive 76, the tubes 72 are also insulated from each other by a thin insulating coating 78 which covers each strip 73. The coating 78 may be an oxide coating, for example, and it also insulates adjacent convolutions of each tube 72 from each other.

The adhesive 76 is also shown as being applied to the inner sides of the strips 73, although they could be applied to the outer sides instead. The liner 71 may be attached to the stator by expanding it in the manner described with regard to FIG. 3 and some of the adhesives 76 and 77 may run into the spaces between the strips during this operation.

Instead of axially spacing the edges of adjacent convolutions of each tube, the convolutions may be overlapped as shown in FIG. 5. This figure shows a liner 81 comprising a plurality of tubes 82, each tube 82 including a helically wound strip 83 of metal having an adlapped as shown in FIG. 5. This figure shows a liner 81 may be secured to the core structure of the stator by another adhesive layer 86. As previously stated, the strips 83 are wound such that their convolutions overlap, and the amount of overlap is over one-third the width of the strip. Adjacent convolutions are spaced from each other however by the adhesive coating, the spaces providing axial discontinuities. The strips of the liner 81 are shown wound such that the overlapped portions of one tube 82 are in radial alignment with overlapped portions of the other of the tubes 82, but of course they may be staggered if desired.

The adhesive layer or coating 84 may be applied to the strips 83 similar to the previous embodiments, that is, either on the inner or outer sides of the strips 83. As shown in FIG. 5, the adhesive 84 is applied to the inner sides of the strips and then partially removed from the innermost of the tubes 82 in order to provide a smooth adhesive free inner surface for the liner. Again, some of the adhesives 84 and 86 may be squeezed into the spaces between the strips when the liner 81 is expanded against the stator.

In FIG. 6 is shown a liner 90 comprising a plurality of tubes 91, each tube comprising a helically wound strip 92 of metal, adjacent convolutions of each strip being spaced to provide discontinuities 93. Adjacent tubes 91 are separated by thin but continuous films 94 formed from a sheet of adhesive insulation extending throughout the length of the liner. The adhesive insulation may be a type which bonds to the metal strips 92 upon contact, or a type which bonds to the strip 92 due to a subsequent heat fusion treatment. If the liner 90 is bonded to the stator, and adhesive insulation may be used for this purpose which is the same as that used between the tubes 91. Of course, some of the adhesive insulation may again be squeezed between adjacent edges of the convolutions of the strips. The relation of the discontinuities of the tubes is similar to that of the liner 71 shown in FIG. 4, but the strips 92 may be wound such that the discontinuities have the relation described with regard to FIG. 3.

From the foregoing, it will be apparent that a novel and useful liner for a motor has been provided, which may be made sufficiently strong to form an effective seal and will nevertheless have relatively low electrical losses. The electrical losses in each tube are low due to the axially spaced electrical discontinuities, which prevent large axial currents, and as many tubes may be provided as is necessary to give the strength desired without materially affecting the other electrical characteristics of the motor.

I claim:

1. In an electric motor, a stator comprising a core structure having a central bore formed therethrough, a plurality of windings carried by said core structure, and a sealing liner positioned within said bore and covering the inner periphery of said core structure, said liner being made of metal and an insulating material and having a plurality of circumferential electrical discontinuities in the axial direction and a plurality of circumferential electrical discontinuities in the radial direction.

2. In a motor as in claim 1, wherein said liner includes a plurality of metal tubes, said tubes being coaxial, and insulating and bonding means separating and securing said tubes together.

3. In a motor as in claim 2, wherein said electrical discontinuities in each of said tubes are radially adjacent electrically continuous portions of adjacent tubes.

4. In a motor as in claim 3, wherein at least three of said tubes are provided, and substantially all of said electrical discontinuities in each of said tubes are radially adjacent electrically continuous portions of all of the other of said tubes.

5. In a motor as in claim 3, wherein at least three of said tubes are provided, each tube comprising a relatively thin elongated strip of metal wound in helical fashion, the edges of the convolutions of each strip being spaced to provide said discontinuities, said discontinuities in each of said tubes being axially spaced from discontinuities of all of the other said tubes.

6. In a motor as in claim 5, wherein the starting point of winding for each of said strips is circumferentially offset from the starting points of winding for the other strips to provide said axial spacing of said discontinuities.

7. In a motor as in claim 1, wherein said liner comprises one or more relatively thin elongated strips of metal wound in helical fashion, and further including insulating and bonding means securing adjacent portions of said strips together and located in said radial and axial discontinuities.

8. In a motor as in claim 7, wherein the edges of the convolutions of each strip are axially spaced to provide said axial electrical discontinuities.

9. In a motor as in claim 1, wherein said liner comprises a plurality of metal tubes, each of said tubes comprising a relatively thin elongated strip of metal wound in helical fashion, and further including insulating and bonding means separating adjacent tubes and securing said tubes together.

10. In a motor as in claim 9, wherein said helically wound strip of each of said tubes includes a plurality of convolutions having substantially the same diameter, the edges of the convolutions being axially spaced and forming said discontinuities therebetween.

11. In a motor as in claim 10, wherein said discontinuities of each of said tubes are radially adjacent electrically continuous portions of adjacent tubes.

12. In a motor as in claim 9, wherein said helically wound strip of each of said tubes includes a plurality of convolutions which overlap each other, the amount of overlap being substantially one-third the width of said strip.

13. In a motor as in claim 12, in which said insulating and bonding means extends between the overlap of the convolutions and secures them together.

14. In a motor as in claim 7, wherein the convolutions overlap each other, and said insulating and bonding means extends between the overlap of the convolutions to secure them together and provides said discontinuities.

15. In a motor as in claim 7, and further including electrical insulating means substantially covering said strip, and in which said insulating and bonding means also secures said liner to said core structure.

16. In a motor as in claim 15, wherein a plurality of tubes is provided and in which said insulating and bonding means secures said tubes together.

17. In a motor as in claim 15, in which said electrical insulating means comprises an oxide of the metal of the tube.

18. In a motor as in claim 1, wherein said liner comprises a plurality of tubes, and further including a plurality of layers of insulating film separating adjacent tubes, each of said layers being from a continuous sheet and extending from end to end of said liner.

19. In a motor as in claim 18, wherein said insulating film also bonds said layers together.

20. A sealing liner for use with an electric motor, the motor including a stator having a core formed therethrough and said liner being adapted to be positioned within the bore and cover the inner periphery of the stator, said liner being made of metal and insulating material and having a plurality of circumferential electrical discontinuities in the axial direction and a plurality of circumferential electrical discontinuities in the radial direction.

21. A sealing liner as in claim 20, wherein said liner comprises a plurality of tubes, and further including insulating and bonding means for electrically separating adjacent tubes and for bonding said tubes together.

References Cited by the Examiner

UNITED STATES PATENTS

| | | | |
|---|---|---|---|
| 1,543,502 | 6/1925 | Hobart | 310—86 |
| 2,322,924 | 6/1943 | Daiger | 310—86 |
| 2,419,159 | 4/1947 | Pezzillo | 310—86 |
| 2,573,126 | 10/1951 | Andrus | 310—86 |
| 2,654,848 | 10/1953 | Schaefer | 310—86 |
| 2,658,452 | 11/1953 | Donelian | 310—86 |
| 2,721,280 | 10/1955 | Dills | 310—86 |
| 2,741,990 | 4/1956 | White | 310—86 |
| 2,777,963 | 1/1957 | Kuntz | 310—86 |
| 2,798,173 | 7/1957 | Penlington | 310—86 |

FOREIGN PATENTS 1,236,543   6/1960   France.

MILTON O. HIRSHFIELD, *Primary Examiner.*

J. W. GIBBS, *Assistant Examiner.*